(12) United States Patent
Magdalena et al.

(10) Patent No.: US 12,127,668 B2
(45) Date of Patent: Oct. 29, 2024

(54) MODULAR SHELVING

(71) Applicant: AR SHELVING, S.A., Galdacano (ES)

(72) Inventors: Pelayo Aldecoa Magdalena, Galdacano (ES); Txabi Zabala Ibañez, Galdacano (ES)

(73) Assignee: AR Shelving, S.A., Galdacano (ES)

( * ) Notice: Subject to any disclaimer, the term of this patent is extended or adjusted under 35 U.S.C. 154(b) by 0 days.

(21) Appl. No.: 18/451,553

(22) Filed: Aug. 17, 2023

(65) Prior Publication Data

US 2024/0057766 A1 Feb. 22, 2024

(30) Foreign Application Priority Data

Aug. 18, 2022 (ES) .................................. 202230756

(51) Int. Cl.
*A47B 47/00* (2006.01)
(52) U.S. Cl.
CPC ...... *A47B 47/0091* (2013.01); *A47B 47/0083* (2013.01)
(58) Field of Classification Search
CPC . A47B 47/0083; A47B 47/0091; A47B 47/02; A47B 47/021; A47B 47/022; A47B 47/024; A47B 47/025; A47B 47/027; A47B 47/028; A47B 47/04; A47B 47/042; A47B 47/045; A47B 47/047; A47B 57/06; A47B 57/26; A47B 57/265; A47B 57/54; A47B 57/545; A47B 87/0207; A47B 87/0215; A47B 87/0223; A47B 87/0246; A47B 87/0253; A47B 87/0261; A47B 87/0269; A47B 2087/023; A47B 2087/0238

USPC ......................................................... 211/188
See application file for complete search history.

(56) References Cited

U.S. PATENT DOCUMENTS

| | | | | | |
|---|---|---|---|---|---|
| 4,099,472 A | * | 7/1978 | Kellogg | ............ | A47B 87/0246 211/186 |
| 4,128,064 A | * | 12/1978 | Chung | ................. | A47B 57/265 248/188 |
| 4,318,352 A | * | 3/1982 | Friedman | ............. | A47B 57/265 248/188 |
| 5,584,398 A | * | 12/1996 | Lin | ....................... | F21V 33/002 362/253 |

(Continued)

FOREIGN PATENT DOCUMENTS

| | | |
|---|---|---|
| DE | 3312763 A1 | 10/1984 |
| DE | 29800527 U1 | 3/1998 |

(Continued)

OTHER PUBLICATIONS

United Kingdom Search Report for GB Application No. 0125320.2, dated Apr. 1, 2003, 1 page.

*Primary Examiner* — Joshua E Rodden
(74) *Attorney, Agent, or Firm* — Barnes & Thornburg, LLP; Tina M. Dorr

(57) ABSTRACT

Modular shelving including at least one shelf supported by at least one tube, wherein said shelf is coupled to said tube by means of a coupling element which is arranged externally in said tube and internally in a hole passing through the shelf, where each coupling element is divided lengthwise into two identical halves which are tongue and groove coupled together and, being coupled, can fit snugly into the hole of the shelf, whereby a tube supporting the shelf is fitted.

7 Claims, 4 Drawing Sheets

(56) References Cited

U.S. PATENT DOCUMENTS

| | | | | |
|---|---|---|---|---|
| 5,881,653 A * | 3/1999 | Pfister | ............... | A47B 87/0223 211/188 |
| 6,065,407 A * | 5/2000 | Wang | ................... | A47B 57/545 211/187 |
| 6,068,143 A * | 5/2000 | Wang | ................... | A47B 57/265 211/187 |
| 6,247,414 B1 * | 6/2001 | Sikora | ............... | A47B 87/0223 108/190 |
| 6,626,605 B1 * | 9/2003 | Dean | ................... | F16B 7/0413 403/379.6 |
| 7,186,050 B2 * | 3/2007 | Dean | ................... | F16B 7/0413 403/379.6 |
| 2003/0131767 A1 * | 7/2003 | Chen | ................... | A47B 57/265 108/147.13 |
| 2008/0061019 A1 * | 3/2008 | Lin | ................... | A47B 47/0091 211/187 |
| 2008/0308516 A1 * | 12/2008 | Li | ..................... | A47B 87/0223 211/153 |
| 2009/0084740 A1 * | 4/2009 | Lin | ................... | A47B 87/0223 211/41.14 |
| 2013/0175233 A1 * | 7/2013 | Wu | ..................... | A47B 47/045 211/183 |
| 2024/0057766 A1 * | 2/2024 | Magdalena | ........ | A47B 87/0223 |

FOREIGN PATENT DOCUMENTS

| | | | |
|---|---|---|---|
| DE | 19711994 C1 | 9/1998 | |
| EP | 0179613 A1 | 4/1986 | |
| ES | 2091518 T3 | 11/1996 | |
| GB | 1133532 A | 11/1968 | |
| GB | 2129674 A | 5/1984 | |
| GB | 2215988 A | 10/1989 | |
| GB | 2382517 A * | 6/2003 | ............. A47B 57/26 |
| KR | 2000-0018231 U | 10/2000 | |

* cited by examiner

MODULAR SHELVING

CROSS-REFERENCE TO RELATED APPLICATION

This application is a U.S. non-provisional application, which claims priority to Spanish Patent Application No. P 202230756, filed Aug. 18, 2022, which is incorporated herein in its entirety by reference.

TECHNICAL FIELD OF THE INVENTION

The present invention refers to a modular shelving, which has application in the furniture industry, and more specifically in the field of domestic furniture, allowing the quick and easy assembly and disassembly of a shelving system adapted to the particular space distribution needs of its user.

BACKGROUND TO THE INVENTION

Nowadays, modular shelving is known for use in the domestic environment, where the distribution and layout of the shelves can be selected according to the user's needs.

In many cases, the sides, top and bottom shelves are mounted using conventional fasteners, while the height of the intermediate shelves can be selected by the user for space allocation. The mounting of these intermediate shelves is usually done by means of pins or pins that fit into both the shelf and the sides.

On the other hand, if the vertical structural elements are tubes, it is necessary to fit the shelves into the tubes in order to connect them. Normally, this arrangement is predefined in the factory, so that the user is not allowed to modularize and distribute the space. In addition, the fixing means to fit the shelves into the supports usually require the use of tools, which complicates and lengthens the assembly, not allowing disassembly in many cases, if the user decides to relocate the shelving. In addition, these fixing means are exposed and are not aesthetically pleasing considering the overall design of the shelving, and therefore do not allow the shelves to be used in all spaces, especially in the interiors of bedrooms, living rooms and lounges.

DESCRIPTION OF THE INVENTION

The present invention relates to a modular shelving or rack, which allows easy, fast and reliable assembly and disassembly of the shelving.

The shelving system proposed by the invention comprises at least one shelf supported by at least one tube, which in the case of being structurally embedded in the floor can support the weight of said at least one shelf.

The at least one shelf is coupled to the at least one tube by means of a coupling element which is located externally on the tube and internally in a hole through the shelf.

In accordance with the invention each coupling element is divided lengthwise into two identical halves, so that when facing each other they can be coupled together by tongue and groove. When these halves are coupled together they can fit snugly into a hole in a shelf.

This allows the shelves to be mounted quickly, easily and robustly on the tubes without the need for any screws. The two halves are clamped together and fixed to the tube. Once in place, the shelf is pushed into the tube and is then pressed into the tube. This solution makes it very easy to attach the tubes to the shelves, without the need for tools, and with high structural reliability.

The invention allows its use, among others, for example, in the field of domestic shelving, in those cases in which the shelves are formed by wooden boards and the vertical structural elements that support the weight of said shelves are formed by metallic tubes that cross said shelves through holes of a larger diameter than that of the tubes themselves.

The coupling element allows the shelf to be coupled to the tubes in such a way that, when passing through the hole in the shelf, it is fitted into the hole, thus allowing the tube and the shelf itself to be fixed in the opposite direction to that in which the weight of the shelf acts. In other words, when the shelf is in use, given the direction of engagement between the connecting piece and the hole in the shelf, the shelf is fixed and immobilized with respect to the tube.

The coupling element is materialized with a general configuration of a bushing which is divided into two halves according to directions parallel to its central axis. Both halves are arranged around the tube and the coupling between them is made by means of tongue and groove elements as shown in the figures, so that once both halves are coupled, the coupling piece is fixed to the tube without any possibility of relative movement once it is fitted into the hole. Obviously, both halves can be uncoupled and removed from the tube as many times as the user requires.

It is envisaged that for each coupling element the shelf may comprise two clamping pieces, one located on each side of the shelf in a close-fitting manner, where the coupling between the coupling element and each clamping piece is achieved by axially locating flanges comprising each coupling element in corresponding coupling openings located on an inner flange of each clamping piece. The clamping pieces act as clamping elements to provide greater rigidity to the joint between the shelf and the tube, thereby also achieving greater rigidity of the whole assembly.

Thus, once axially seated, a relative rotation of the clamping piece with respect to the coupling element results in the retention of the flanges on the inner flange of the clamping piece, which contacts and butts against the bottom surface of the shelf.

It is also envisaged that each clamping piece may be fitted with a sealing cap to cover the openings and the annular space between the tube and a perimeter contour of the clamping piece by clipping the sealing openings of each clamping piece, thus protecting the inside of the clamping piece from dirt and making it more aesthetically pleasing.

The connection between the upper and lower tubes in an intermediate shelf can be made by means of an internally threaded rod on both tubes. The connection between the tubes to achieve the desired height is made by means of an internal threaded rod.

DESCRIPTION OF THE DRAWINGS

To complement the description being made and in order to assist in a better understanding of the features of the invention, in accordance with a preferred example of a practical embodiment thereof, a set of drawings is attached hereto as an integral part of the said description, in which the following is illustratively and non-limitingly depicted.

PREFERRED EMBODIMENT OF THE INVENTION

Figure 1:
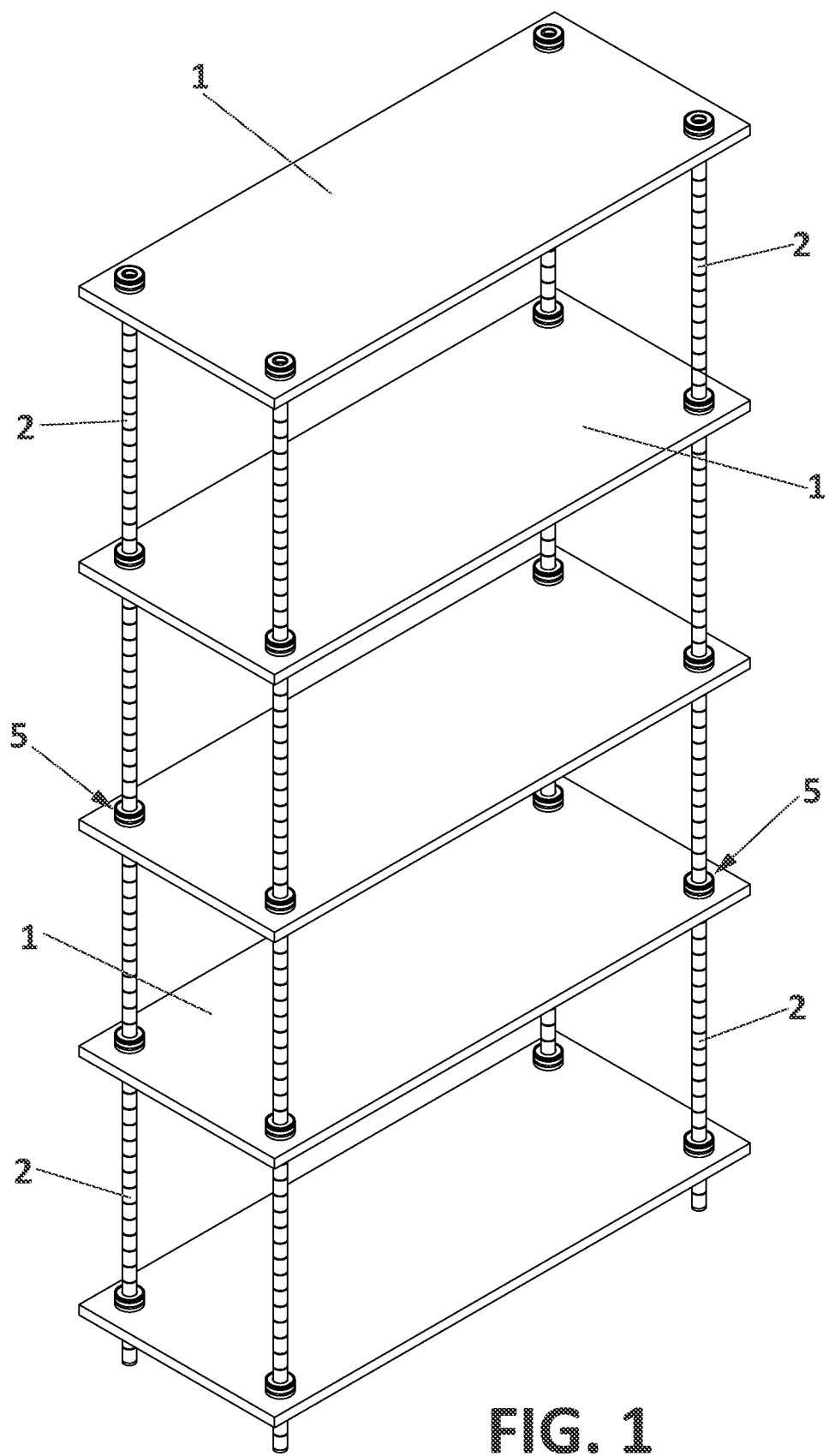
FIG. 1—Shows a schematic perspective view of an embodiment of the shelving system of the invention with five shelves and four columns of tubes.

In view of the figures shown, it can be seen how in one of the possible embodiments of the invention the shelving system proposed by the invention comprises five shelves (1) supported by four columns of tubes (2), where each section of the column of tubes (2) between shelves (1) is formed by a tube (2) which is coupled to the next one by means of a threaded rod (11) internally to both tubes (2).

Each coupling element (4) is arranged to embrace the tube (2) by means of two halves that insert flanges into the grooves of the tube (2) and are fixed to it. On its outer side, the coupling element (4) has projections to support the shelf (1). The shelf (1) and tube (2) assembly is fixed with the clamping pieces (5) arranged above and below the coupling element (4), which provides the necessary rigidity to the assembly.

Figure 2:
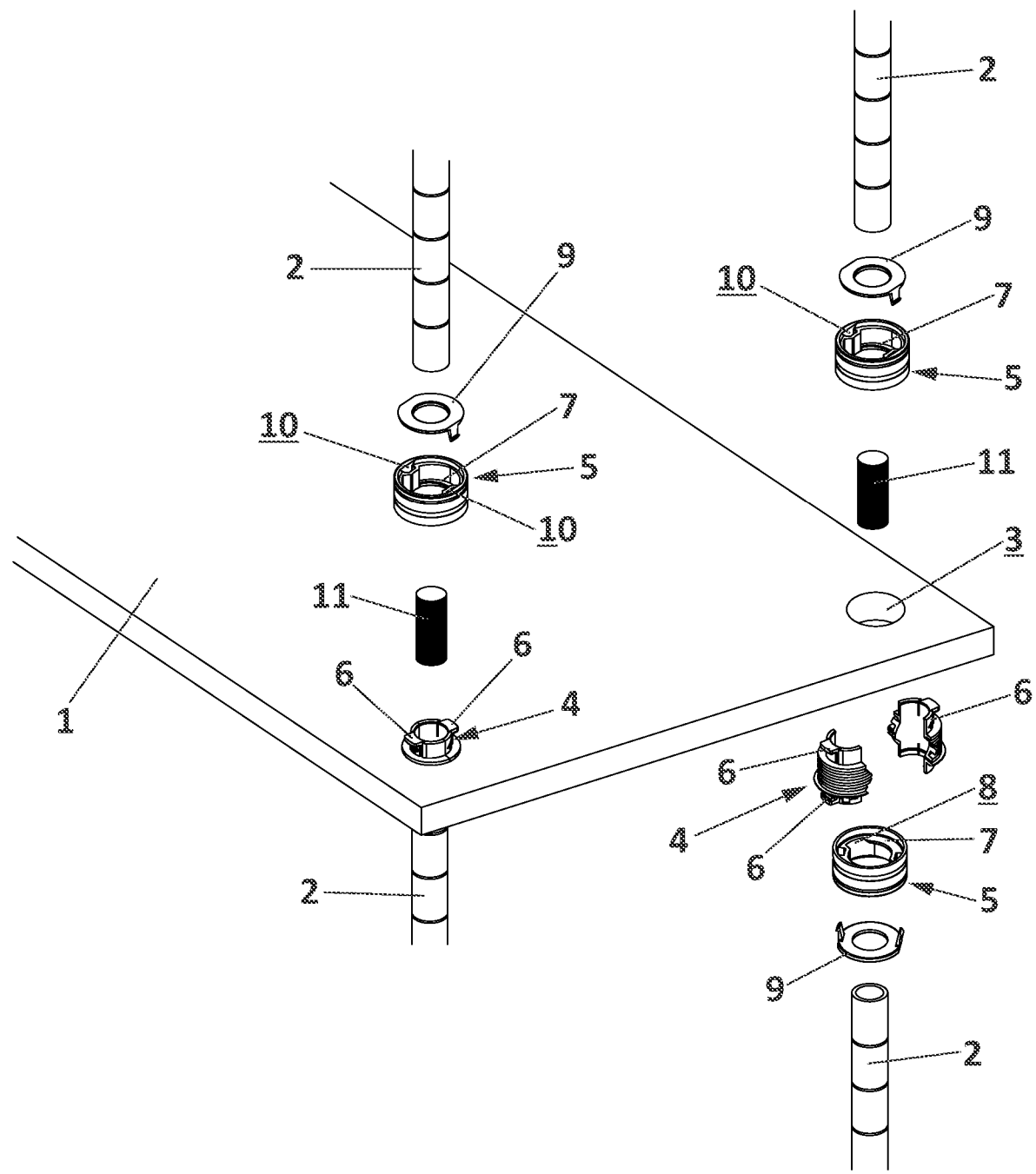
FIG. 2—Shows a detail in exploded perspective of the coupling between an intermediate shelf and the tubes corresponding to two holes, where the arrangement between the different parts and elements comprising the shelving of the invention has been represented in explosion.

As can be seen in FIG. 2, each coupling element (4) is divided lengthwise into two identical halves, so that when they face each other they can be coupled together by means of tongue and groove. When these halves are coupled, they can fit snugly into a hole (3) of a shelf (1), and a tube (2) supporting the shelf (1) is fitted into it. In the case of an intermediate shelf, a lower tube (2) and an upper tube (2) are fitted into the same coupling element (4).

In turn, for each coupling element (4) the shelf comprises two clamping pieces (5), one positioned on each side of the shelf (1) in a close-fitting manner, where the coupling between the coupling element (4) and each clamping piece (5) is achieved by axially engaging flanges (6) comprising each coupling element (4) into corresponding coupling openings (8) located on an inner flange (7) of each clamping piece (5). Once axially seated, a relative rotation of the clamping piece (5) with respect to the coupling element (4) results in the retention of the tabs (6) on the inner flange (7) of the clamping piece (5), which contacts and butts against the bottom surface of the shelf.

In the embodiment shown, the shelf (1) at the top is supported by four lower tubes (2), while the shelves (1) in between are supported by four lower tubes (2) and are also coupled at the top with four upper tubes (2). The tubes (2) and the holes (3) of the shelves (1) have a circular cross-section.

Figure 3:
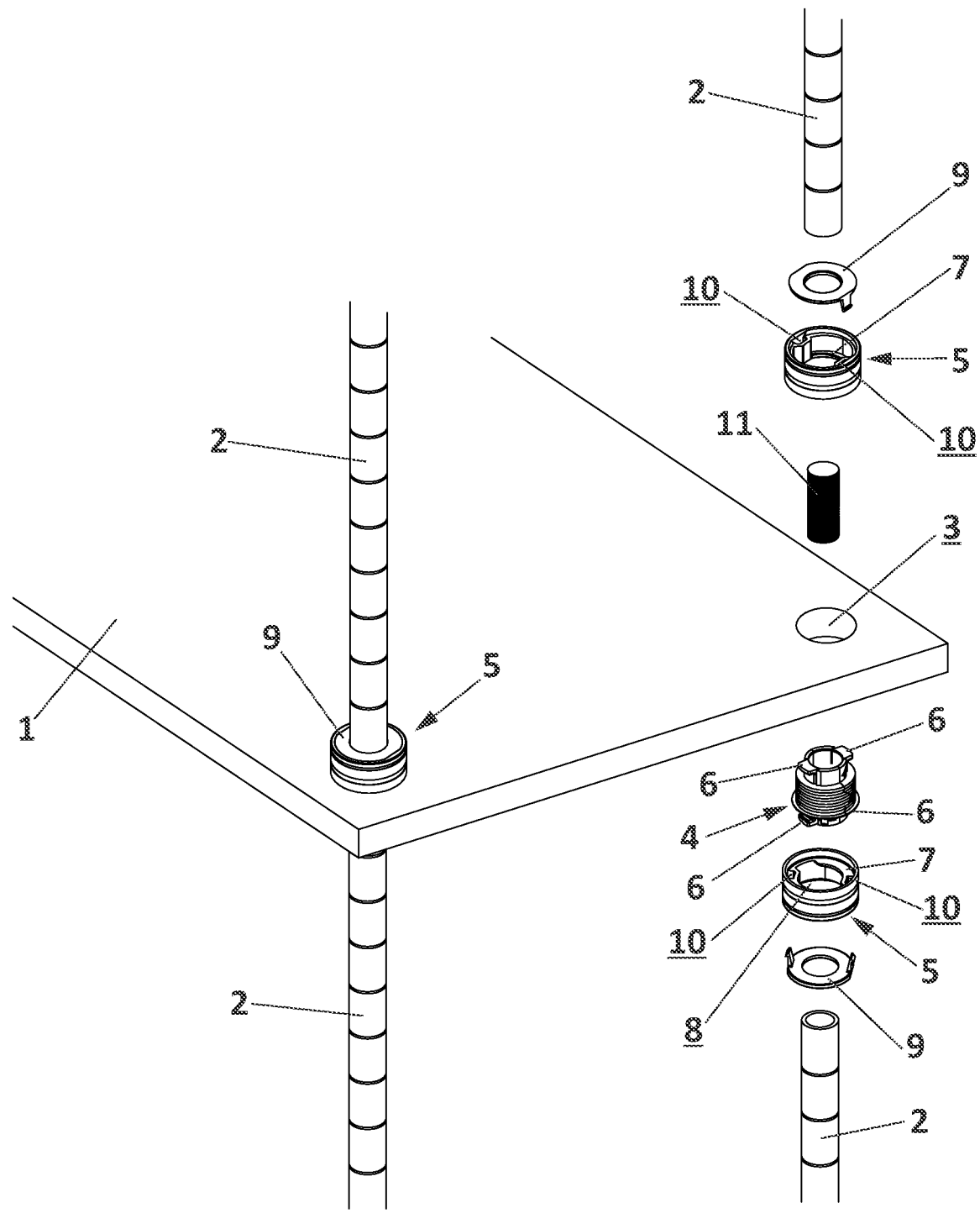
FIG. 3—Shows a view as in FIG. 2 of a sequential instant later in the arrangement between parts than that shown in FIG. 2.
Figure 4:
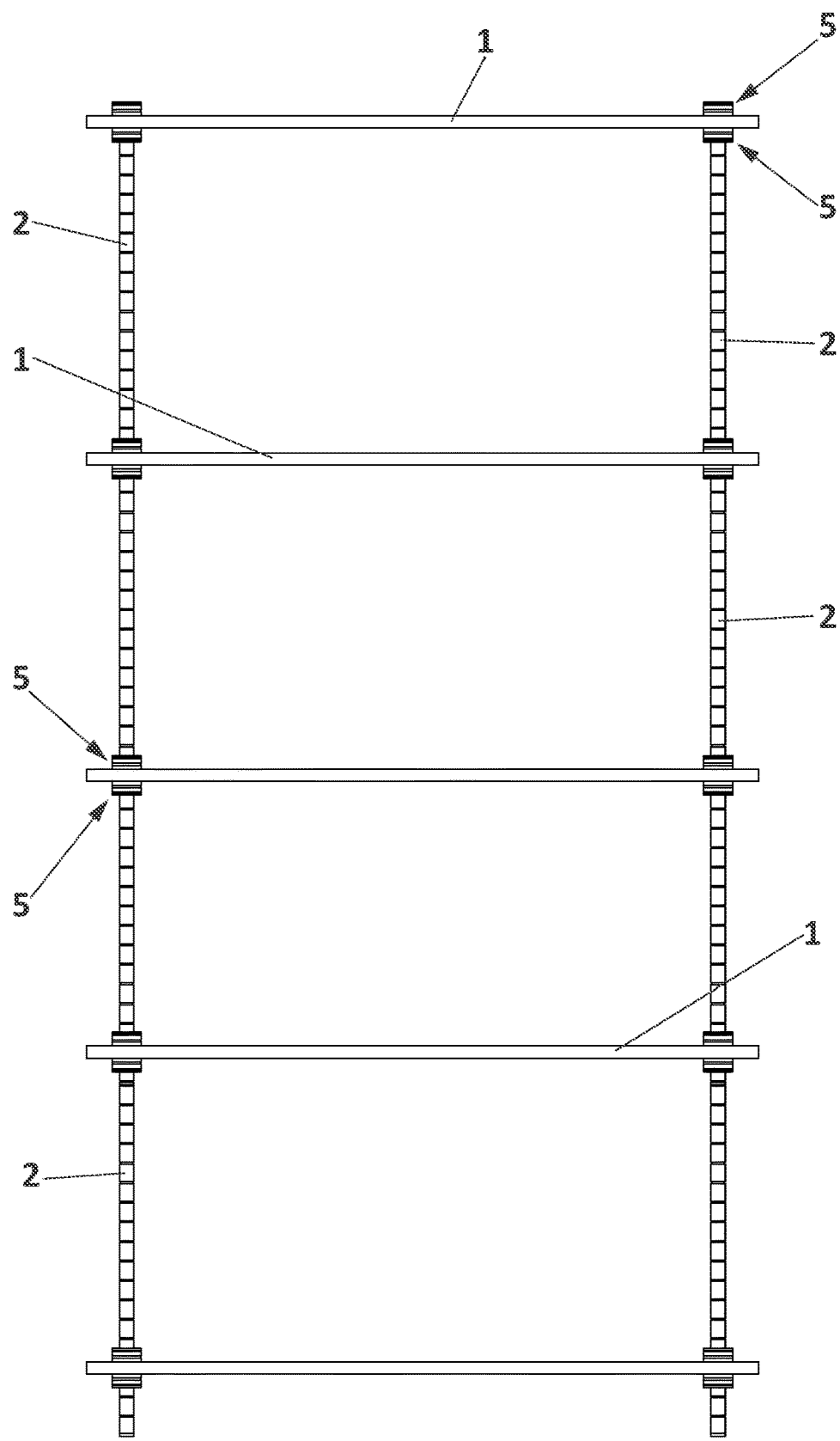
FIG. 4—Shows an elevation view of the shelving system shown in FIG. 1.

As shown in FIGS. 2 and 3, each clamping piece (5) is fitted with a sealing cap (9) which covers the openings (8) and the annular space between the tube (2) and a perimeter contour of the clamping piece (5) by clipping into the sealing openings (10) of each clamping piece (5).

As mentioned above, the coupling between the upper and lower tubes (2) in an intermediate shelf (1) can be achieved by means of a threaded rod (11) internally to both tubes (2), thus achieving the desired height.

It is envisaged that the coupling elements (4), the clamping pieces (5) and the sealing caps (9) will be made of plastic material, which reduces the cost of production and at the same time reduces the weight of the entire shelving.

In the case of annularly scored tubes (2), the coupling element (4) can be positioned at any point on the scored tube (2).

In view of this description and set of figures, the person skilled in the art will understand that the embodiments of the invention that have been described can be combined in multiple ways within the subject matter of the invention. The invention has been described according to some preferred embodiments thereof, but it will be apparent to the person skilled in the art that multiple variations can be introduced into such preferred embodiments without exceeding the claimed subject matter of the invention.

The invention claimed is:

1. Modular shelving comprising at least one shelf supported by at least one tube, wherein said at least one shelf is coupled to said at least one tube by means of at least one coupling element which is arranged externally on said tube and internally in at least one hole which passes through the shelf, wherein each coupling element is divided longitudinally into two identical halves which fit together by means of a tongue and groove joint and, being coupled, configured to be fit tightly into the hole of the shelf, whereby the tube supporting the shelf is fitted;

wherein for each coupling element the shelving comprises two clamping pieces, one positioned on each side of the shelf in a close-fitting manner, wherein the coupling between the coupling element and each clamping piece is achieved by axially engaging flanges located on each coupling element in corresponding coupling openings located in an inner flange of each clamping piece, so that the relative rotation of the clamping piece relative to the coupling element, once axially seated, causes the retention of the tabs on the inner flange of the clamping piece; and wherein each clamping piece has a sealing cap that covers openings and the annular space between the tube and a perimeter contour of said clamping piece by means of clipping in some sealing openings that each clamping piece has.

2. Modular shelving according to claim 1, wherein the at least one tube comprises at least three tubes.

3. Modular shelving according to claim 1, wherein the at least one shelf comprises at least two shelves, such that one shelf of the at least two shelves is located at a top and is supported by a first tube of the at least one tube below, while another shelf of the at least two shelves is located in between the first tube of the at least one tube and a second tube of the at least one tube below and is supported by the second tube of the at least one tube below and is also coupled at the top with the first tube of the at least one tube above.

4. Modular shelving according to claim 1, wherein said at least one tube and the holes of said at least one shelf have a circular cross section.

5. Modular shelving according to claim 3, in which the coupling between the first tube of the at least one tube and the second tube of the at least one tube in the another shelf of the at least one shelf is made by means of a threaded rod internally to both the first tube of the at least one tube and the second tube of the at least one tube.

6. Modular shelving according to claim 1, wherein said coupling element is made of plastic material.

7. Modular shelving according to claim 1, wherein the two clamping pieces are made of plastic material.

* * * * *